July 13, 1965 C. D. JEFFRIES ETAL 3,195,061

RADIO FREQUENCY AMPLIFICATION BY STIMULATED EMISSION OF RADIATION

Filed May 28, 1963 2 Sheets-Sheet 1

INVENTORS
CARSON D. JEFFRIES
OWEN CHAMBERLAIN
CLAUDE H. SCHULTZ
GILBERT SHAPIRO

BY Roland A. Anderson
ATTORNEY

July 13, 1965 C. D. JEFFRIES ETAL 3,195,061
RADIO FREQUENCY AMPLIFICATION BY STIMULATED EMISSION OF RADIATION
Filed May 28, 1963 2 Sheets-Sheet 2

Fig. 2.

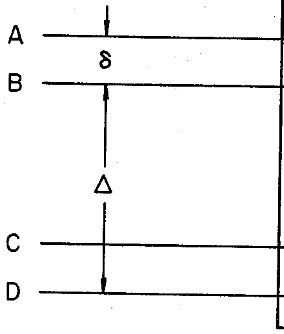

| | $M_e$ ELECTRON SPIN | $M_p$ PROTON SPIN | RELATIVE POPULATION AT EQUILIBRIUM | RELATIVE POPULATION WHEN AD IS SATURATED |
|---|---|---|---|---|
| A | $+\frac{1}{2}$ | $-\frac{1}{2}$ | $e^{-\frac{(\Delta+\delta)}{kT}}$ | 1 |
| B | $+\frac{1}{2}$ | $+\frac{1}{2}$ | $e^{-\frac{\Delta}{kT}}$ | $e^{-\frac{\Delta}{kT}}$ |
| C | $-\frac{1}{2}$ | $-\frac{1}{2}$ | $e^{-\frac{\delta}{kT}}$ | $e^{+\frac{\Delta}{kT}}$ |
| D | $-\frac{1}{2}$ | $+\frac{1}{2}$ | 1 | 1 |

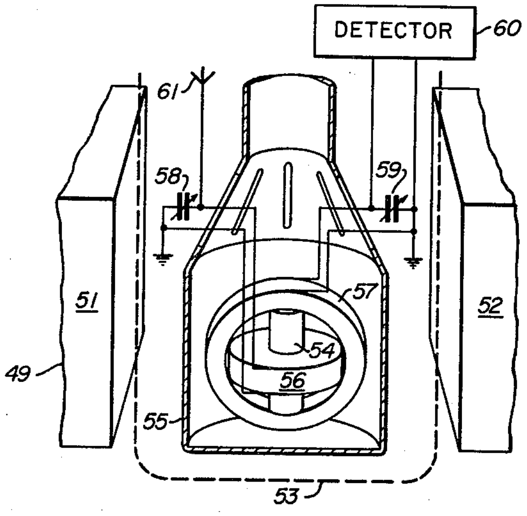

Fig. 3.

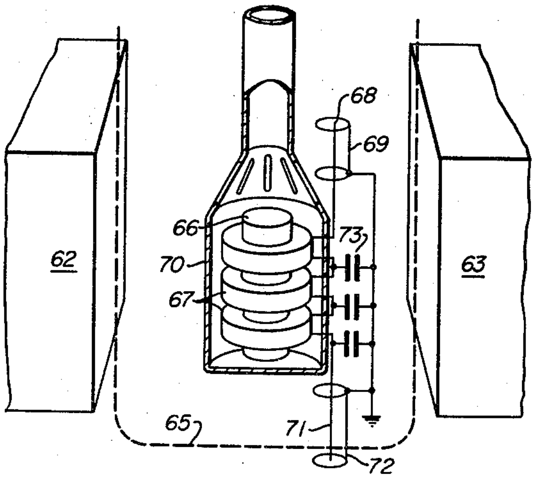

Fig. 4.

INVENTORS
CARSON D. JEFFRIES
OWEN CHAMBERLAIN
CLAUDE H. SCHULTZ
GILBERT SHAPIRO
BY
Roland A. Anderson
ATTORNEY

United States Patent Office 3,195,061

Patented July 13, 1965

3,195,061

RADIO FREQUENCY AMPLIFICATION BY STIMULATED EMISSION OF RADIATION

Carson D. Jeffries, Owen Chamberlain, Claude H. Schultz, and Gilbert Shapiro, Berkeley, Calif., assignors to the United States of America as represented by the United States Atomic Energy Commission Filed May 28, 1963, Ser. No. 284,302
7 Claims. (Cl. 330—4)

Figure 1:
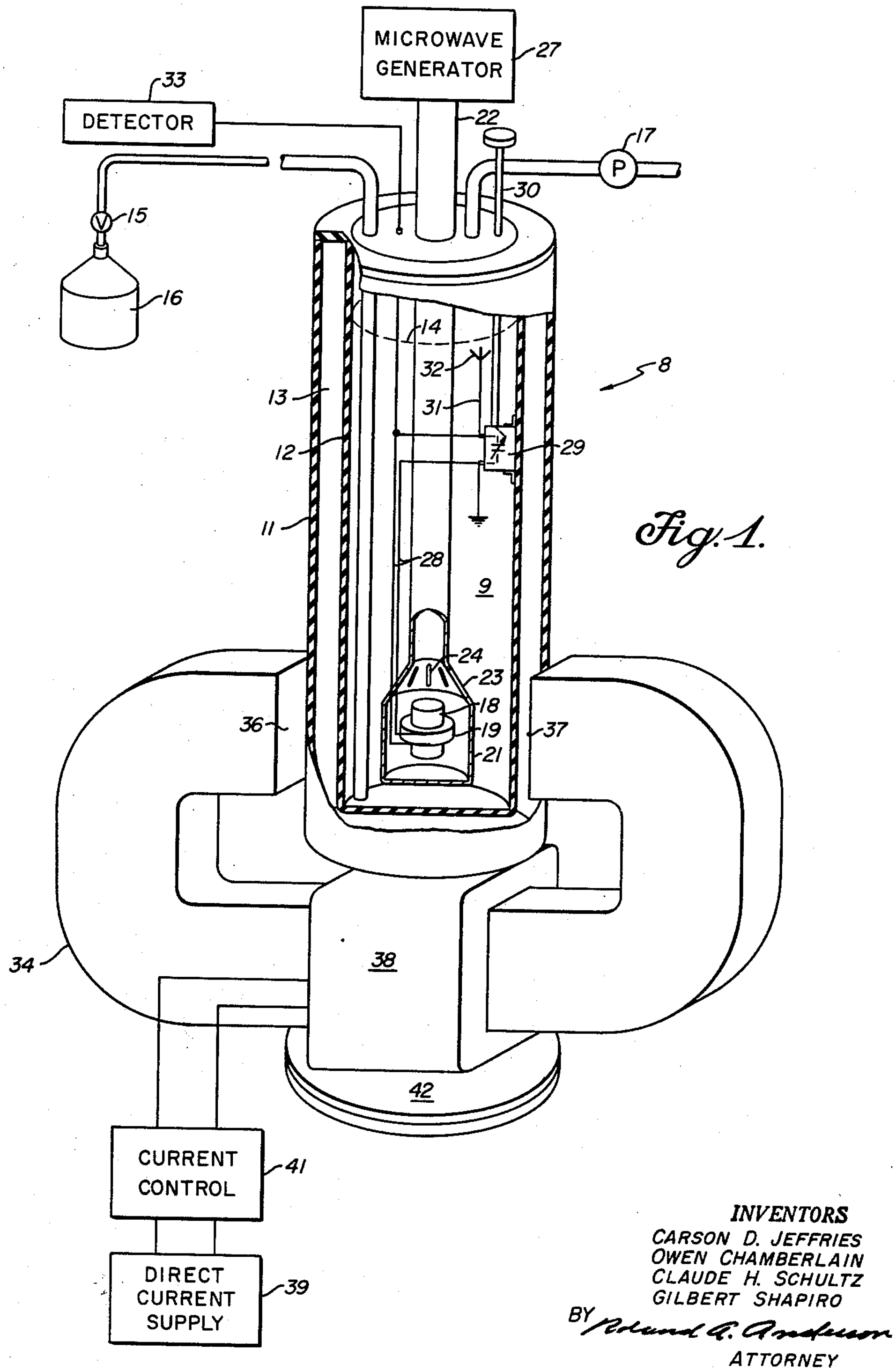

The present invention relates generally to the amplification of electrical signals and more particularly to apparatus for amplifying signals in the radio-frequency range with a much lower noise level than has heretofore been attained. The invention will be identified as the RASER, for the initial letters of Radio-Frequency Amplification by Stimulated Emission of Radiation, in accordance with the prior practice in the case of the maser and laser.

Amplification as provided by masers and lasers depends upon providing population inversion of the levels of a quantum mechanical system, such as a crystal, so that the higher level has a greater population than the lower level. To shift the quanta to a higher level, radiation of a particular frequency is supplied to the system. In general this will not be the frequency at which amplification takes place. This radiation is known as the pump signal. The relation between the frequency (V) of radiation, corresponding to a transition between two particular levels of the system, and the energy spacing E, between those levels is given by Planck's formula, $E=hV$. Planck's constant ($h$) equals $6.6\times10^{-27}$ erg-seconds.

The present invention includes a system having energy levels which are sufficiently close together that radio frequencies may be amplified. As a further advantage the frequency at which the invention operates is continuously adjustable over a very wide range. Accordingly the invention has various uses, a highly important one being the amplification of very low amplitude input signals. Amplifiers of the type represented by masers, lasers and the present invention have an internal noise level which is lower by several orders of magnitude than the best vacuum tube or transistor amplifiers. Thus very weak signals such as might originate from distant space vehicles may be detected by the present invention in cases where such signals are undetectable by other means. The invention may also be utilized for other purposes among which are use as an oscillator, as a secondary frequency standard, and as a device for measuring magnetic field intensities.

The invention, like the maser and laser, utilizes the interactions of atomic electrons in excited states to obtain amplification. However, the present invention additionally utilizes interactions of the atomic nuclei in which the spins interact with a magnetic field to produce energy level spacings suitable for amplifying radio frequencies. To obtain such an effect, a crystalline material, of the general class which constitute dilute paramagnetic systems, is disposed under cryogenic conditions in a polarizing magnetic field and a pump signal is applied. The thermal agitation of the electrons is minimized at low temperatures so that spin polarization can be obtained with a readily producible magnetic field intensity. A weak radio frequency signal may then be coupled to the crystalline material and an amplified signal obtained therefrom.

Accordingly, it is an object of the present invention to provide an improved low noise radio-frequency amplifier having greater amplification than previous low noise amplifiers.

It is another object of the present invention to provide an amplifier in which amplification is obtained through the usage of "forbidden transitions."

It is another object of the present invention to provide a low noise type of amplifier in which the response frequency may be conveniently tuned by altering the *g*-factor or electron spin factor.

It is an object of the invention to provide a superior amplifying medium for a maser type of radio-frequency amplifier.

It is another object of the present invention to provide a new means for obtaining stimulated emission of radiation for signal amplification.

It is another object of the present invention to provide a means for transferring electron spin polarization to proton in order to obtain energy level differentials sufficiently low that radio frequencies may be amplified.

The invention, together with further objects and advantages thereof, will be better understood by reference to the following specification in conjunction with the accompanying drawings of which:

FIGURE 1 is a broken out perspective view showing a first embodiment of the invention as adapted for amplifying radio frequency signals, FIGURE 2 is a quantum mechanical system energy level diagram and an associated table of corresponding energy values indicative of phenomena which occur during the operation of the invention, FIGURE 3 is a perspective view of a modified means for providing input and output coupling in the apparatus of FIGURE 1, and FIGURE 4 is a perspective view of another modification of the apparatus of FIGURE 1 showing means for providing several stages of amplification therein.

Referring now to FIGURE 1, there is shown a cryostat 8 with means for maintaining an inner chamber 9 at a temperature of approximately 1.5° Kelvin. To provide such low temperature, the cryostat 8 has an outer wall 11 and an inner wall 12 spaced therefrom to form a cylindrical chamber 13 in the space therebetween, which chamber is evacuated for heat insulation. Liquid helium 14 from a tank 16 is supplied through a control valve 15 to the chamber 9 within the inner wall 12. Vaporized helium is removed by a pump 17.

A cavity cylinder 21, which may be either tuned or untuned, is disposed within the chamber 9 and constitutes a conductive RF chamber. A cylindrical crystal 18, disposed within the cavity 21, is of a type susceptible to dynamic nuclear orientation. This property is exhibited to some degree by virtually any dilute paramagnetic system, however it has been found that a paramagnetic salt, lanthanum magnesium double nitrate, $$La_2Mg_3(NO_3)_{12}\cdot24H_2O$$

in which approximately 1% of the lanthanum atoms have been replaced by even isotopes of neodymium is far more effective than most substances. The crystal 18 is encircled by a radio frequency solenoid coil 19 which is preferably, although not necessarily, made from a superconducting material so that the low noise characteristic of the amplifier may be maximized.

A waveguide 22 extends into the cryostat 8 along the long axis thereof and terminates at a downwardly flared transition section 23 which is above the cavity 21 and which defines the upper wall of the RF chamber of the cavity. Transition section 23 is provided with longitudinal slots 24 to facilitate circulation of liquid helium through the region of crystal 18 and for the passage of connecting wires 28. Electromagnetic energy is applied to the crystal 18 through the waveguide 22 which is connected to an external microwave generator 27. The electromagnetic energy functions to transfer electron spin polarization to proton spin polarization as will hereinafter be discussed.

A variable capacitor 29, disposed in the cryostat 8, is externally controllable by turning a shaft 30 which is connected to the rotor of the capacitor and which shaft extends through the top of the cryostat. The variable capacitor 29 is connected in parallel with the coil 19 through interconnecting wires 28, one side of the capacitor being connected to ground and the other side being connected through a lead 31 to an antenna 32 or other source of signals to be amplified.

Preferably, the capacitor 29, lead 31, and antenna 32 are disposed within the low temperature environment of cryostat 8 to keep the noise level of the circuit at a very low value. For similar reasons, the leads which interconnect the foregoing elements, except for lead 31, are preferably made from a superconducting material. In a circuit of the class described, the resistance of lead 31 provides circuit stability, as discussed hereinafter. By such measures, the very low noise potential of the invention is fully realized.

The variable capacitor 29 and coil 19 form a parallel resonant circuit tuned to the frequency of an input signal which is to be amplified in the crystal 18. A detector 33 is connected to the ungrounded side of the capacitor 29 and receives the amplified signals from the crystal 18. Such signals may be further amplified with conventional amplifiers if desired.

The crystal 18 must be disposed in a magnetic field so that the electron spins within the crystal can be polarized. To provide such magnetic field, a C-shaped electromagnet 34 is disposed with spaced apart pole faces 36 and 37 on opposite sides of cryostat 8 in the region of crystal 18, thereby providing a field normal to the axis of the crystal. A magnet coil 38 encircles the central portion of magnet 34 to provide for activation thereof. A direct current supply 39 is connected to the coil 38 through a current intensity control 41.

While the crystal 18 will function for the purpose of the present invention at a higher temperature than 1.5° Kelvin, a much more intense magnetic field is necessary at higher temperatures to effectively polarize the electron spins. It is generally more practical to provide the lower temperature than it is to provide a more powerful magnet. The $z$ axis of the crystal is generally, although not necessarily, aligned perpendicular to the magnetic field to obtain the maximum effectiveness of such field. However, in isotropic crystals no alignment is necessary.

The magnet 34 is mounted on a rotatable turntable 42 so that the magnet can be rotated on a vertical axis around the cryostat 8, which is stationary, thus changing the alignment of the magnetic field with respect to the crystal 18. Such alignment alters the electron spin $g$-factor for purposes hereinafter to be discussed.

In operation, the high frequency microwave generator 27 supplies pumping energy to raise the quanta levels of orbital electrons in the crystal 18. The magnetic field is provided through the crystal 18 so that unpaired electron spins in the neodymium atoms of crystal 18 are mutually aligned. The electron spins are polarized antiparallel to the applied magnetic field to the extent $Pe$ where:

$$Pe = \tan h \frac{g\mu_B H}{2kT}$$

and:

$g$ is the electron spin factor (in this instance the value of $g$, which depends on the orientation of the crystal with regard to the magnetic field, ranges from 0.36 to 2.70), $\mu_B$ is the Bohr magnetron unit of magnetic moment for the electron, H is the magnetic field in oersteds, $k$ is the Boltzman's constant, and T is temperature in degrees Kelvin.

Electron spin polarization, and thus an equal percentage of proton polarization, in excess of 50% is readily attainable. Normally, in the absence of the techniques of the present invention, atomic nuclei have a much smaller magnetic moment ($\frac{1}{650}$ of that of electrons) and thus the proton polarization is correspondingly less. The power from the microwave generator 27 enables the electron spin polarization, at the neodymium atomic sites, to be transferred to the spin of the hydrogen nuclei in the crystal water of hydration.

There is a weak magnetic dipole-dipole interaction between the unpaired electron spin and neighboring hydrogen nucleus which can be represented by the level diagram and table as shown in FIGURE 2. With reference to FIGURE 2, $Me$ and $Mp$ are, for the electron and proton spin respectively, the quantum numbers of the projection of the spin along the direction of the external magnetic field. Levels B and D, and A and C, each pair separated by energy $\Delta$, are closely coupled through the lattice and can be expected to relax rapidly when the relative population levels are perturbed so that the distribution between such levels is always given by Boltzman factor $e^{-\Delta}/kT$.

Population inversion is achieved by saturating the "forbidden" transition AD with microwave radiation. These two levels will then be equally populated while the B and C will readjust to be in equilibrium with D and A respectively. The net polarization is then given by:

$$Pp = \frac{(-)(1)+(+)(e^{-\Delta}/kT)+(-)(e^{+\Delta}/kT)+(+)(1)}{(1)+(e^{-\Delta}/kT)+(e^{+\Delta}/kT)+(1)} = -\tan h \frac{\Delta}{2kT}$$

The microwave generator 27 is set at the particular frequency corresponding to the energy transition $(\delta+\Delta)$ between A–D levels. When an input signal is applied to the crystal 18 at a frequency corresponding to the energy transition $(\delta)$ between the A–B levels, emission of radiation is stimulated via transitions from the A to the B level and more energy is released by such stimulated emission than is utilized in triggering the emission. Thus the input signal is amplified.

In the operation of the apparatus of FIGURE 1, the magnet 34 and the microwave generator 27 are energized, and the cryostat 8 temperature is lowered to a superconductive level. The energy from the microwave generator 27 causes the population at quantum level A to increase to match the population level of D. Input signals of the proper frequency received at the antenna 32 are then amplified in crystal 18 by the process hereinbefore described. In the tuned circuit formed by the capacitor 29 and coil 19 there is in effect a negative resistance $(-r)$ due to the amplification in the crystal 18. In the circuit as shown in FIGURE 1, the resistance of the lead 31 is effectively in series with such negative resistance. The detector 33 is connected at the juncture of the resistance of lead 31 and the negative resistance and therefore receives an amplified signal. For stability, the absolute resistance of the lead 31 should exceed that of the negative resistance. Gain is then computed as:

$$\text{Gain} = \frac{-r}{R-r}$$

where: R is the resistance in lead 31.

The response frequency of the amplifier is tunable by varying the magnetic field intensity. Altering the magnetic field intensity by one gauss shifts the response frequency by 4.2 kilocycles. The microwave generator 27 frequency must be correspondingly adjusted to match the change in energy difference between the quantum levels. However, a fixed frequency microwave system can be used conveniently over a wide range of magnetic field values (hence a wide range of radio frequencies of the amplifier) simply by re-orienting the magnet 34 with respect to the crystal 18 and thus changing the electron spin $g$-factor. Of course, any frequency change must be accompanied by a corresponding adjustment of the tuning capacitor 29.

The natural bandwidth of the proton signal in the described crystal 18 is approximately 50 kilocycles which is satisfactory for voice signals. The bandwidth may be broadened by deliberately introducing magnetic field inhomogeneities over the volume of the crystal and in this manner, any desired shape tuning curve may be designed.

Considering now further characteristics of interest, the relaxation time of the proton polarization (i.e. with microwave power turned off) is of the order of ten minutes. Spontaneous emission is negligible as a source of noise. No noise tempertaure higher than 1.5° K. is present in the system. This is orders of magnitude better than any existing amplifier in the radio frequency range.

Referring now to FIGURE 3, there is shown an alternate means for separating the output signal from the input signal, the apparatus being similar to the embodiment of FIGURE 1 except as herein discussed. There is shown in FIGURE 3 a magnet 49 as in FIGURE 1 with pole pieces 51 and 52. A cryostat 53, similar to the cryostat 8 of FIGURE 1, is indicated only by dashed lines to avoid duplication. A crystal 54, identical to the crystal 18 of FIGURE 1, is disposed within the cryostat in a cavity 55 between the pole pieces 51 and 52. Separate input and output coils 56 and 57 are disposed around the crystal 54 with the axes of the two coils perpendicular to each other and to the applied magnetic field. Input and output tuning capacitors 58 and 59 are connected in parallel with the input and output coils 56 and 57 respectively to form resonant circuits at the input signal frequency. Again, the input coil 56 may be connected to an antenna 61 while the output coil 57 is connected to a detector 60. The microwave pump signal and cryostat functions are identical to that of the previously described apparatus of FIGURE 1. In this embodiment of the invention, there is no mutual inductance between the coils 56, 57 so that the only coupling is through the crystal 54.

Input signals are coupled to the crystal 54 through the input coil 56 and the amplified signal from the crystal is induced into the output coil 57, isolating the output circuit from directly coupled signals from the input circuit. Thus input signals are induced in the output circuit only through the action of the polarized spins, thereby promoting circuit stability in situations where feedback might be a problem.

If several stages of amplification are required, the modification of the invention shown in FIGURE 4 may be utilized. The microwave energy pump, the temperature conditions, and the magnetic field are the same as that described with regard to the embodiments of the invention shown in FIGURES 1 and 3. A cryostat indicated by a dashed line 65 and microwave cavity 70, are disposed between the pole pieces 62 and 63 of a magnet as previously described. A crystal 66, having a composition similar to that previously described, has a plurality of spaced series connected coils 67 disposed therearound. One end of the series connected coils 67 is connected to the center conductor 68 of a signal input coaxial conductor 69 while the other end of the series coils is connected to the center conductor 71 of an output coaxial conductor 72. A separate capacitor 73 is connected from the output side of each coil 67 to a ground connection tied to the outer shields of the coaxial conductors 69 and 72. Thus, a lumped-parameter transmission line is formed in which the gain at each stage (each coil 67-capacitor 73 combination being one stage) is:

$$\text{Gain}=\frac{|r|}{wL}$$

where $|r|$ is the absolute value of the negative resistance ($-r$) obtained from the amplification in the crystal 66 minus ohmic resistance in the coils and the interconnecting wires and where $wL$ is 6.28 times the inductance of a coil 67. It is not necessary that the crystal 66 be a single entity in this embodiment of the invention, separate smaller crystals may be used with each stage.

The invention has been herein described largely in terms of its embodiment as a signal receiving amplifier. It will be apparent to those skilled in the art however that the apparatus may be readily adapted to serve other related circuit functions. For example, if positive feedback is provided in the amplifier circuit described, the circuit can function as a radio frequency oscillator. Frequency modulation of the oscillator signal may be obtained by time varying the external magnetic field using an auxiliary set of field coils near the crystal. On the other hand, the output frequency of such an oscillator can be accurately fixed by utilizing a permanent magnet to provide the polarizing field, rather than an electromagnet as described. Such a fixed frequency oscillator may be utilized as a secondary frequency standard. Conversely, since the frequency of such an oscillator is dependent upon magnetic field strength, the present invention can be utilized for measuring an unknown magnetic field strength by measuring the output frequency obtained when the crystal is disposed in the unknown field.

Thus while the invention has been disclosed with respect to certain exemplary embodiments, it will be apparent to those skilled in the art that numerous variations and modifications may be made within the spirit and scope of the invention and it is not intended to limit the invention except as defined in the following claims.

What is claimed is:

1. An amplifier having a very low noise level comprising, in combination, means forming a low temperature chamber, an anisotropic crystal disposed in said low temperature chamber, said crystal containing lanthanum magnesium double nitrate in which a portion of the lanthanum atoms thereof have been replaced by even isotopes of neodymium, and electromagnetic pumping signal generator coupled to said crystal, a signal input source coupled to said crystal, an output circuit coupled to said crystal, and means producing a magnetic field through said crystal.

2. An amplifier as described in claim 2 comprises the further combinations of means for rotating said magnetic field relative to said crystal whereby the response frequency of said amplifier may be adjusted.

3. In a radio-frequency amplifier, the combination comprising a cryostat, a crystal disposed within said cryostat which crystal contains lanthanum magnesium double nitrate in which a small portion of the lanthanum atoms have been replaced by even isotopes of neodymium, a waveguide directed towards said crystal within said chamber, a microwave generator coupled to said waveguide, a radio-frequency signal input circuit coupled to said crystal, an amplified signal output circuit coupled to said crystal, and means producing a magnetic field through said crystal.

4. In apparatus for ampifying radio frequency signals, the combination comprising means providing a magnetic field, a material disposed in said magnetic field which material contains lanthanum magnesium double nitrate in which a portion of the lanthanum atoms thereof have been replaced by even isotopes of neodymium, a source of pumping signal energy coupled to said material, an input circuit for coupling signals to be amplified to said material, and an amplified signal output circuit coupled to said material.

5. In an amplifier for radio frequencies, the combination comprising a cryostat having a low temperature chamber, means providing a selectively variable magnetic field within said chamber of said cryostat, an anisotropic crystal disposed within said chamber and composed at least in part of lanthanum magnesium double nitrate in which a small portion of the lanthanum atoms have been replaced by even numbered isotopes of neodymium, a high frequency pumping signal generator coupled to said crystal, input means coupled to said crystal for transmitting signals to be amplified thereto, an output circuit having a coil disposed proximal to said crystal for transmitting amplified output signals therefrom, and a tuning capacitor connected in parallel with said coil for adjusting the resonant frequency of the output circuit when said magnetic field is varied to change the response frequency of said amplifier.

6. In a radio frequency amplifier circuit component, the combination comprising a cryostat enclosure, a crystal formed of lanthanum magnesium double nitrate in which a portion of the lanthanum atoms are replaced by an even isotope of neodymium, said crystal having a molecular structure in which a first and second discrete upper energy level is separated from a lower energy level by energies $\Delta$ and $\delta+\Delta$ respectively, said crystal being disposed in said enclosure, means producing a magnetic field through said crystal, a high frequency pumping signal generator coupled to said enclosure and having a frequency given by $$\frac{\Delta+\delta}{h}$$

where $h$ is Planck's constant, input means coupled to said crystal for transmitting signals to be amplified thereto, and a tuned output signal circuit coupled to said crystal, said output circuit having a resonant frequency substantially equal to $\delta/h$.

7. Apparatus for ampifying radio frequency signals comprising a cryogenic enclosure, a crystal disposed within said enclosure, said crystal being of the class formed of lanthanum magnesium double nitrate in which a small portion of lanthanum atoms are replaced by an even isotope of neodymium, a high frequency power source coupled to said crystal for inverting the population of electron energy levels therein, means producing a magnetic field through said crystal, an annular radio frequency signal input coil disposed within said enclosure and inductively coupled to said crystal, the axis of said input coil being perpendicular to said magnetic field, an annular output coil inductively coupled to said crystal within said enclosure, the axis of said output coil being perpendicular to the axis of said input coil and also being perpendicular to said magnetic field.

References Cited by the Examiner

UNITED STATES PATENTS

| | | | |
|---|---|---|---|
| 3,075,156 | 1/63 | Anderson et al. | 330—4 |
| 3,080,519 | 3/63 | McCoubrey et al. | 330—4 |

FOREIGN PATENTS

| | | |
|---|---|---|
| 1,229,917 | 3/60 | France. |

OTHER REFERENCES

"Advances in Quantum Electronics," edited by Singer, pages 579–580 (Uebersfeld et al.), Columbia University Press (New York), 1961.

ROY LAKE, *Primary Examiner.*